Figure 1:
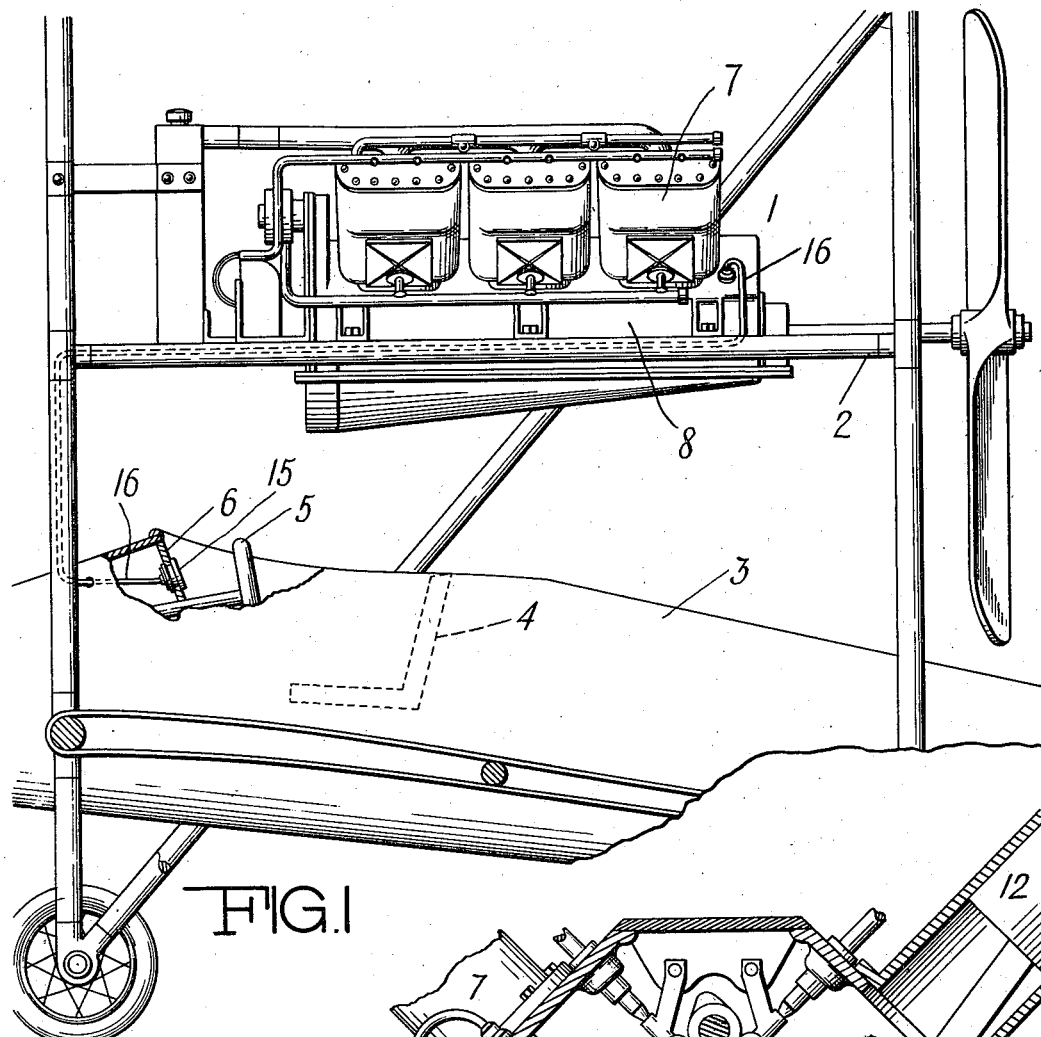

May 8, 1923.

H. H. BOYCE 1,454,149

TEMPERATURE INDICATING SYSTEM AND APPARATUS FOR INTERNAL COMBUSTION ENGINES

Original Filed July 14, 1917

Inventor
Harrison H. Boyce
By his Attorney
Edmund Quincy Moses

Patented May 8, 1923.

1,454,149

UNITED STATES PATENT OFFICE.

HARRISON HURLBUT BOYCE, OF JERICHO, NEW YORK.

TEMPERATURE-INDICATING SYSTEM AND APPARATUS FOR INTERNAL-COMBUSTION ENGINES.

Application filed July 14, 1917, Serial No. 180,580. Renewed October 2, 1922. Serial No. 591,973.

*To all whom it may concern:*

Be it known that I, HARRISON H. BOYCE, a citizen of the United States, residing at Jericho, in the county of Nassau and State of New York, have invented certain new and useful Improvements in Temperature-Indicating Systems and Apparatus for Internal-Combustion Engines, of which the following is a full, clear, and exact description.

This invention relates to the indication of the thermal condition of internal combustion engines and is particlularly applicable to the indication of such conditions to the drivers of the propelling motors of motor vehicles such as aeroplanes, automobiles and motor boats. It is highly desirable for the operator of an internal combustion engine to have at all times a definite indication of the thermal condition of the engine as the temperature of the engine is a guide both to the efficiency and safety of operation. That is to say an internal combustion engine will operate most economically and smoothly at or near a definite substantially constant temperature and also may be operated safely only within certain temperature ranges. For example, if the engine is too cold it is well known that the consumption of fuel for power delivered will be increased and also that the engine will "miss" and will lack power and smoothness in operation. At very low temperatures there is danger of the cooling water freezing. On the other hand if unduly high temperatures are reached there may be loss in efficiency due to increased friction caused by the expansion of the parts, imperfect lubrication, over expansion of the charge reducing the amount of fuel drawn into the cylinders and pre-ignition. Engine overheating is also exceedingly dangerous owing to carbonization of the lubricating oil, expansion of the pistons to such an extent that they may seize in the cylinders, boiling away of the cooling liquid, burning out of bearings and other well known evils resulting from these causes.

By providing proper indicating means for showing the engine temperatures it is manifest that the operator of the engine may be warned of changes in conditions causing a departure from the normal range of temperature and may take such steps as may be needful to secure proper operation and avoid injury to the motor. Provision of such indicating means is particularly important in the case of vehicle motors which are usually so located as not to be capable of close observation by the driver when the vehicle is moving. This is true for example, of an automobile motor located under a hood or of an aeroplane motor which is frequently located behind the driver or over his head.

The present invention contemplates the securing of an indication of engine temperatures by introducing a temperature responsive element into the engine crank case. In a great majority of motor vehicle engines, particularly such as are employed on automobiles and aeroplanes, the engine cylinders are supported at their lower ends which open into a closed chamber or crank case in which is mounted in suitable bearings, the crank shaft carrying the cranks to which the pistons are connected by connecting rods. Oil is carried to the cylinders and bearings either by a pressure feed or by the splash system in which the rapidly rotating cranks enter a body of oil in the lower part of the crank case and cause the oil to splash into the cylinders and over the moving parts or by a combination of such systems. In each case the surplus oil returns to a reservoir in the lower part of the crank case and in each case also the oil returning from the cylinders is broken up into a fine spray or mist by the rapidly moving cranks and rods so that the entire crank case above the body of oil in the lower part thereof is filled with a fine spray or mist of oil. The temperature of this oil mist responds closely to temperature changes in the engine as it surrounds the various bearings, contacts with the pistons and cylinder walls, much of it in fact having just come out of the cylinders, and is kept in a continual state of agitation by the rapidly moving piston rods and cranks. Due to these factors its temperature changes quickly with the temperature of the engine, ordinarily much more quickly than the body of oil in the lower portion or reservoir of the crank case owing to greater mass of such body of oil and to its location in the part of the crank case farthest from the engine cylinders.

Figure 2:
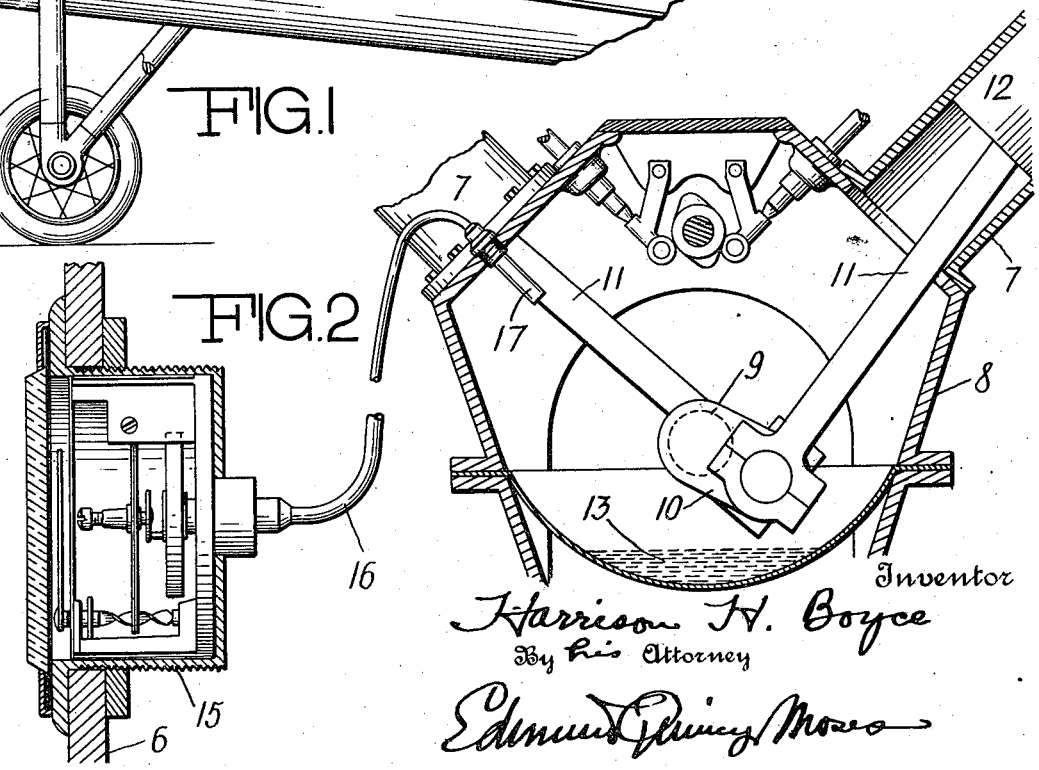

In the accompanying drawings which form a part of this specification I have illustrated one preferred embodiment of my invention as applied to an aeroplane engine. In these drawings Figure 1 is a diagrammatic view showing a portion of an aeroplane body and frame with an engine mounted thereon over the driver's position and showing temperature indicating means having the temperature responsive element located in the crank case and the indicating instrument located on the dash or instrument board in position to be most conveniently observed by the driver while operating the aeroplane. Figure 2 is a view showing a form of indicating instrument in vertical section and the engine crank case in transverse sectional section with the temperature responsive element located therein.

Referring to the drawings in detail, numeral 1 designates the internal combustion engine of an aeroplane mounted on the frame 2 in any suitable manner, the engine being indicated as supported over the car or body 3. The driver seated in the car in a seat 4 manipulates the controls 5 and has located in front of him an instrument board 6 on which are placed the instruments which it is necessary for him to have under observation. The motor comprises the cylinders 7 mounted on the crank case 8 longitudinally of which extends the crank shaft 9. 10 are the cranks carried by the crank shaft which are connected by the usual connecting rods 11 with the pistons 12 reciprocating in the cylinders. The cylinders open at their lower ends directly into the crank case in a well understood manner. The lower part of the crank case constitutes a reservoir containing a body of oil 13. In the particular embodiment of the invention illustrated I have shown as the temperature indicating means, an air thermometer of the character described in the application for patent of Herman Schlaisch, Serial No. 175,244, filed June 18, 1917, having an indicating instrument 15 mounted on the instrument board 6, this instrument being connected by small flexible tube 16 with a bulb 17 introduced into the crank case, preferably into the upper part of the same at the rear end. It will be understood that any other suitable type of temperature indicating instrument may be employed. The location of the temperature responsive element in the part of the crank case filled with air and oil vapor or mist is desirable and this mist surrounding as it does the bearings and entering the lower part of the cylinders and contacting with the pistons, has a temperature which is at all times dependent upon the engine temperatures and which changes quickly with any changes in temperature of the cylinder or bearings due to overheating from any cause. No substantial changes in temperature can take place in the engine without almost immediately producing corresponding relative changes in temperature in this space. The instrument will therefore indicate quickly such temperature changes and at once bring to the notice of the operator the existence of the changed conditions so as to enable him to take the necessary steps to maintain the satisfactory operation of the engine. The location of the temperature responsive element at the rear end of the crank case is desirable particularly in aeroplane motors as this part of the crank case is least subject to the influence of the external air through the aeroplane is rapidly moving. Temperature changes in this part of the crank case will therefore correspond more closely with the actual conditions in the engine cylinders.

The introduction of a temperature responsive element into the part of the crank case above the oil reservoir is desirable also from a mechanical point of view as it avoids making any opening below the oil level which might permit the leakage of oil and it also does not necessitate the tapping of cylinders, water jackets or any part of the cooling water system so that water leaks are avoided.

I have found that the system described provides efficient and satisfactory means for indicating engine temperature conditions at all times so as to enable the operator to avoid the dangers of engine over-heating and maintain the power plant in a satisfactory condition of operation.

While I have described in detail one specific embodiment of my invention as applied to an aeroplane motor it is to be understood that this embodiment is merely illustrative of the invention and that the invention may be utilized in connection with other engines and that other types of temperature responsive and indicating means may be employed. I therefore do not desire to limit myself to this specific embodiment but intend to cover my invention broadly in whatever form its principle may be embodied.

Having thus described my invention I claim:

1. In a temperature indicating means for internal combustion engines having cylinders opening into the crank case, which also constitutes an oil reservoir, the combination with the crank case of a temperature indicating instrument having a temperature responsive element exposed within the crank case above the normal level of the oil when quiescent but so as to be subjected to the splashing and dripping of the oil when agitated by the running of the engine.

2. In temperature indicating means for internal combustion engines, the combination with the engine crank case and cylinders mounted thereon opening into said crank case of temperature indicating means including a temperature responsive element located in the upper part of the crank case in position to be influenced by the temperature of the oil mist in the crank case, said temperature indicating means being constructed so as to show the thermal condition of the engine at all times.

HARRISON HURLBUT BOYCE.